April 24, 1956  LE CONIE STILES  2,742,868
METHOD AND APPARATUS FOR MAKING BUTTERHORNS
Filed Feb. 26, 1951  2 Sheets-Sheet 1

INVENTOR.
Le Conie Stiles

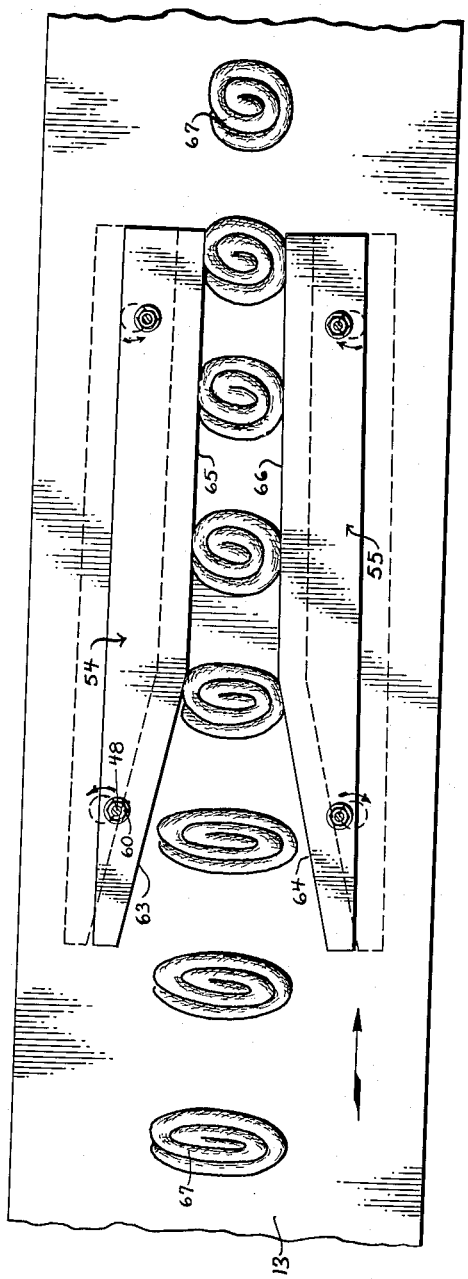
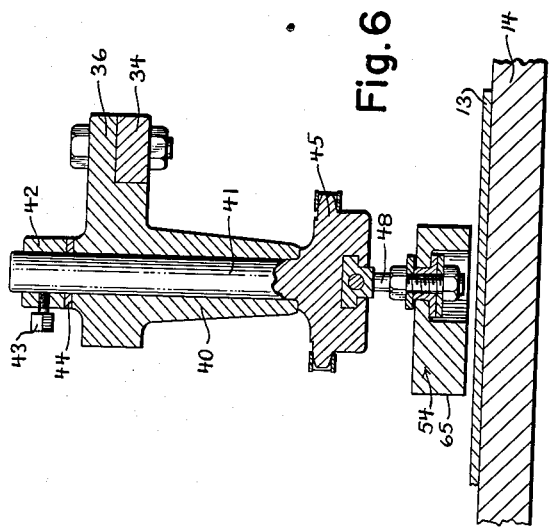
INVENTOR.
Le Conie Stiles

United States Patent Office 2,742,868
Patented Apr. 24, 1956

2,742,868
METHOD AND APPARATUS FOR MAKING BUTTERHORNS

Le Conie Stiles, Seattle, Wash.

Application February 26, 1951, Serial No. 212,787

10 Claims. (Cl. 107—9)

This invention relates to the method and apparatus for the mass production of butterhorns and other like or suitable coffee cakes comprised of a spirally-rolled strip of dough coated upon the upper side with a topping mixture.

As disclosed in my prior United States Patent No. 2,345,637, issued April 4, 1944, a preferred method of forming individual dough bodies for butterhorns prior to baking embodies the initial step of conveying an elongated rolled body of sheeted dough upon a feed belt to a reciprocating knife which is arranged to cut the dough body transversely at spaced intervals of its length to produce individual slices of dough, each spirally rolled. The slices fall from the knife onto a conveyor belt, termed an inspection belt in my said prior patent, and this belt carries them to a device which applies a topping substance. However, this method is open to the objection that there is a tendency of the knife to flatten the dough body as it cuts therethrough, and in consequence the butterhorns produced have an oval form.

Accordingly, it is the principal object of the present invention to provide a mechanism whereby the dough slices can be easily and effectively reshaped to a rounded configuration without necessitating manual handling of the same, and more particularly a mechanism which will automatically reshape the slices while they are being carried by a conveyor belt between the slicing and the topping operations.

A further aim of the invention is to devise a mechanism of this nature which can be easily adjusted to accommodate the same to various sizes and thicknesses of dough bodies.

With the foregoing and other still more particular objects and advantages in view, the invention consists in the novel construction and in the adaptation and combination of parts hereinafter described and claimed.

In the accompanying drawings:

Fig. 5 is a horizontal sectional view taken along line 5—5 of Fig. 2 and illustrating the action of the forming blocks on the dough bodies, the innermost position of the blocks being shown in full lines and the outermost position thereof being shown in dotted lines; and Fig. 6 is a vertical sectional view taken along line 6—6 of Fig. 2.

Figure 1:
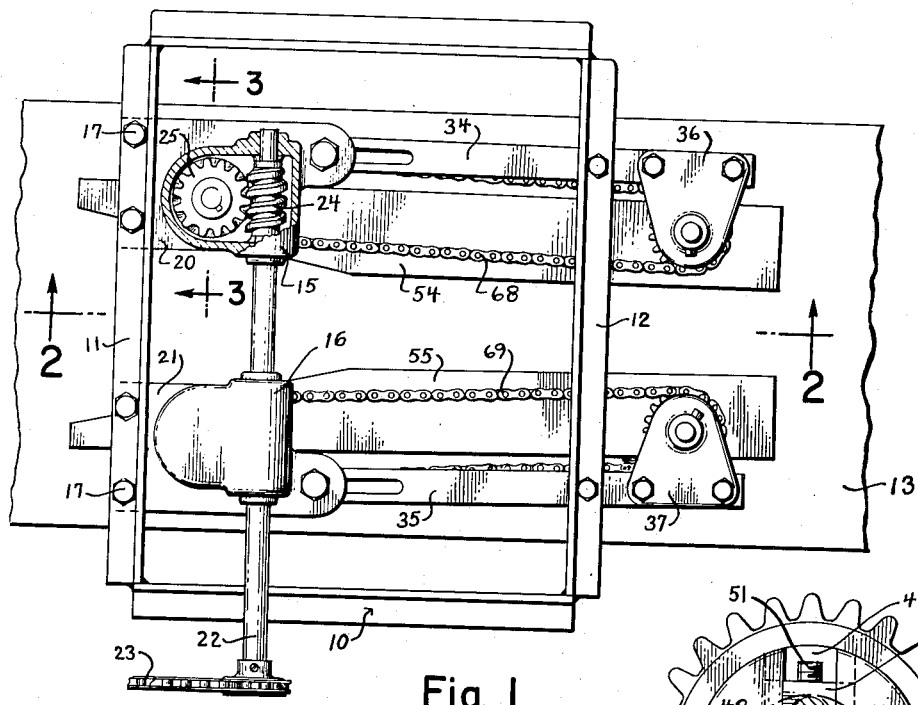
Figure 1 is a top plan view of the invention with one of the gear boxes partly broken away and the conveyor belt and driving chain shown fragmentarily.

Referring to the drawings, it is seen that the working mechanism of the present invention is supported by a frame 10 presenting longitudinally spaced cross-members 11 and 12 which are elevated above an endless conveyor belt 13 running along a table 14. This belt as aforesaid is located in following relation to a cutting knife (not shown) functioning to slice a rolled body of sheeted dough transversely at uniformly spaced intervals of its length so that the resulting oval shaped slices will drop onto the belt with their major axis substantially transverse thereto. A pair of laterally spaced gear boxes 15 and 16 are hung at the front end from the cross-member 11 as by bolts 17 passing through marginally extending horizontal flanges 20 and 21 presented by the gear boxes. Journaled in the latter is a common drive shaft 22 suitably driven by a chain 23. This shaft drives a pair of worms 24 of opposite hands each meshing a respective worm gear 25, the worm-and-gear sets being housed in the gear boxes. The gear boxes are open at the bottom, and boltably attached to the underside of the boxes as closures for these openings are the flange heads 27 of pendant journal necks 28. Secured to the worm gears and journaled in the journal necks are a pair of vertical shafts 31 whose function will become apparent in the course of the following description.

Figure 4:
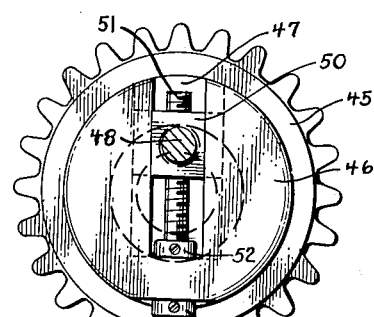
Fig. 4 is a horizontal sectional view taken along line 4—4 of Fig. 3.
Figure 2:
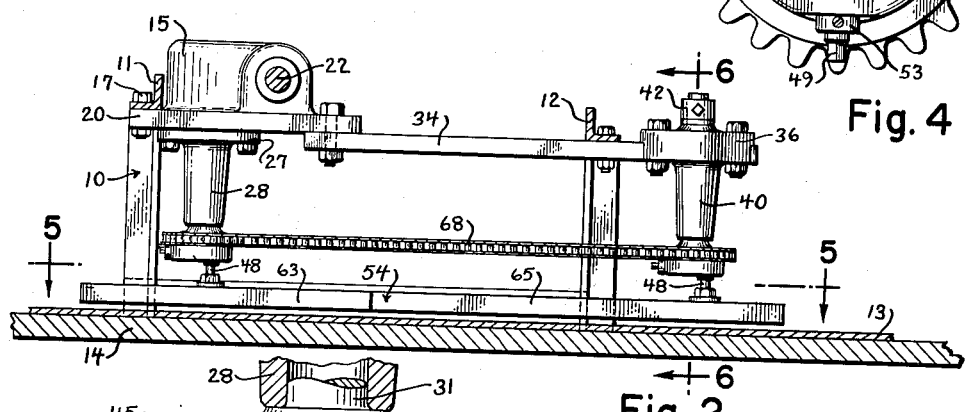
Fig. 2 is a vertical sectional view taken along line 2—2 of Fig. 1.
Figure 3:
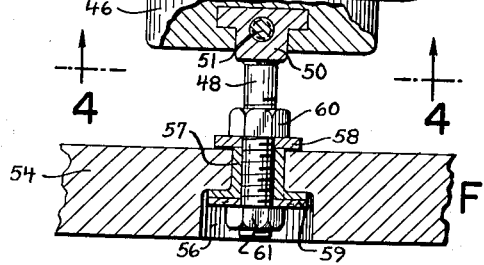
Fig. 3 is a fragmentary vertical sectional view taken along line 3—3 of Fig. 1.

Continuing to the aft end of the frame it is seen that the cross-member 12 carries a pair of laterally spaced arms 34 and 35 extending fore and aft therefrom. These arms are bolted at their front ends to the gearbox flanges 20 and 21 and are fitted at their other ends into undercuts provided at the outer sides of identical horizontal anchoring flanges 36 and 37 presented by vertically extending journal necks 40 similar to the necks 28. Shafts 41 are received in the necks 40 and as best shown in Fig. 6 each is sustained by a thrust collar 42 fixed to the upper end of the shaft by a set screw 43 and seated upon a washer 44. The shafts 31 and 41 each carry a variable crank and sprocket unit at their lower end. Since the units are identical the same reference numerals will be applied to the respective parts thereof. Referring particularly to Figs. 3 and 4 for a detailed showing of one of these units, it is seen that such includes a sprocket wheel 45 secured in this particular instance to one of the shafts 31. A hub prominence 46 is provided at the underside of the sprocket wheel, and formed in this hub is a T-slot 47 extending diametrically from the periphery of the hub to a point somewhat past the center thereof. Slidably received in this slot is the T-head 50 of a depending crank pin 48 threaded at its lower end. The throw of the crank pin is controlled by a jack-screw 51, the head end of which passes through the end wall of the T-slot and is held against endwise movement by a pair of thrust collars 52 and 53. The extreme end of the jack-screw presents a square stud 49 to accommodate a wrench used in turning the screw for responsively causing the T-head to walk along the slot and thus vary the throw of the related crank pin.

Carried by the longitudinally aligned pairs of crank pins are laterally spaced elongated forming blocks 54 and 55, the connection between one of these pins and the block 54 being detailed in Figs. 3 and 6. From these views it is seen that the block is vertically bored and has a counterbore 56 on the underside. Fitted into the bore is a bushing 57 presenting at its lower end an annular flange which is seated in the counterbore 56. Washers 58 and 59 are held against the top and bottom faces of the sleeve by nuts 60 and 61 when the pin is positioned within the bushing. The length of the latter is such that when the lower nut 61 is brought up tight sufficient clearance is maintained between the upper washer 58 and the top face of the forming block to permit free turning of the bushing. The position of the upper nut 60 perforce determines the distance to which the respective end of the forming block is elevated above the conveyor belt and this distance may, if desired, be varied according to the thickness of the dough bodies which are to be rounded.

The action of the forming blocks on the dough bodies is illustrated in Fig. 5. In this view it will be noted that the crank pins for the block 55 turn clockwise about their orbit while the pins for the other block 54 turn counterclockwise as shown by the arcuate arrows. Since the throws of the crank pins for each forming block are equal in length, each block partakes of parallel motion. In other words each position of one of the blocks as it moves is parallel to every other position thereof. It will be noted that the opposed inner surfaces of the forming blocks present, therebetween, a working throat which is comparatively wide at the entering end, narrows rather rapidly for a minor portion of the length, and thereafter converges only slightly. The more rapidly narrowing portion of the throat is defined between opposed faces 63 and 64 and will be hereinafter referred to as the lead-in portion. The more constricted portion of the throat is defined between opposed faces 65 and 66.

From the foregoing description it can be seen that the forming blocks are given opposed reciprocal motion and that as they move through the last quarter of their cyclic action toward the extreme inner limit of this reciprocal travel, such limit being shown by full lines in Fig. 5, they are also caused to move bodily in directional correspondence with the travel of the conveyor belt. This bodily movement acts upon the dough bodies which are entering the lead-in portion of the throat to cause the same to be gently nudged into alignment with the longitudinal axis of the throat, such dough bodies being denoted by the numeral 67. The throw of the crank pins is set so that the minimum gap between the forming blocks, and namely at the forwardmost restricted end of the working throat, corresponds to the desired diameter of the dough bodies. In this regard the slope of the opposed working faces 65 and 66 is such that normally, when this minimum gap setting is made, the gap at the lead-in end of such faces is only slightly less than the major axis of the oval dough bodies. The speed of the drive shaft is such that the forming blocks complete a number of reciprocatory cycles while a dough body is carried the length of the working throat. Accordingly, each dough body is patted several times adjacent the ends of its major axis as it progresses through the gradually narrowing portion of the working and hence when it leaves such throat it has a substantially round configuration.

It is thought that the invention will have been clearly understood from the foregoing detailed description of my now preferred embodiment. Minor changes in the details of construction may be made without departing from the spirit of the invention, and I intend that the hereto annexed claims be given a scope fully commensurate with the broadest interpretation which the employed language fairly permits.

What I claim is:

1. In combination with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for repeated cyclic synchronized motion toward and away from one another, there being a minimum gap between the blocks approximately corresponding to the desired diameter of the dough bodies, and means for imparting such motion to the blocks.

2. In combination with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for repeated cyclic synchronized motion toward and away from one another, there being a minimum gap between the blocks approximately corresponding to the desired diameter of the dough bodies, the blocks having opposed faces which converge somewhat when the blocks lie at the inner extreme of their reciprocal movement, and means for imparting such motion to the blocks.

3. In combintion with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for repeated cyclic synchronized motion toward and away from one another, there being a minimum gap between the blocks approximately corresponding to the desired diameter of the dough bodies, means for adjusting the said minimum gap, and means for imparting said motion to the blocks.

4. In combination with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for repeated cyclic synchronized motion toward and away from one another, there being a minimum gap between the blocks approximately corresponding to the desired diameter of the dough bodies, means for adjusting the blocks vertically in relation to the belt, and means for imparting said motion to the blocks.

5. In combination with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for repeated cyclic synchronized motion toward and away from one another, there being a minimum gap between the blocks approximately corresponding to the desired diameter of the dough bodies, and means for imparting such motion to the blocks, the speed of the belt being so related to the cyclical frequency of the blocks that the blocks complete a plurality of reciprocal cycles during the interval of time required for each dough body to travel the length of the gap between the blocks.

6. In combination with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for cyclic synchronized motion toward and away from one another and each arranged for individual parallel motion, there being minimum gap between the blocks approximately corresponding to the desired diameter of the dough bodies, and means for imparting such motions to the blocks.

7. In combintion with a conveyor belt, a machine for rounding oval dough bodies which are carried on the belt with their minor axes substantially aligned and coinciding with their travel path, said machine comprising a pair of elongated laterally spaced forming blocks mounted above the belt and on opposite sides of the said travel path for cyclic synchronized motion toward and away from one another and each arranged for individual parallel motion, there being minimum gap between the blocks approximately corresponding to the desired diameter of the dough bodies, means for imparting such motions to the blocks, said means including a power-driven pair of variable crank pins for each block interconnected with the respective block at longitudinally spaced points thereon.

8. In combination with a conveyor belt, a machine for rounding oval dough bodies which are carried on the belt with their minor axes substantially aligned and coinsiding with their travel path, said machine comprising a frame extending above the belt, two pairs of vertical crank pins journaled for eccentric motion, a pair of elongated and laterally spaced forming blocks each carried by a respective pair of said crank pins so that the blocks partake of cyclic synchronized motion toward and away from one another while at the same time having individual parallel motion, and means supported by the frame for moving each pair of said crank pins in unison.

9. In combination with a conveyor belt, a machine for rounding oval dough bodies which are carried on the belt with their minor axes substantially aligned and coinciding with their travel path, said machine comprising a frame extending above the belt, two pairs of vertical crank pins journaled for eccentric motion, a pair of elongated and laterally spaced forming blocks each carried by a respective pair of said crank pins so that the blocks partake of cyclic synchronized motion toward and away from one another while at the same time having individual parallel motion, means supported by the frame for moving each pair of said crank pins in unison, and means for varying the throw of the crank pins to adjust the minimum gap between the blocks into correspondence with the desired diameter of the dough bodies.

10. A method of rounding an oval dough body carried on a moving conveyor belt with its minor axes substantially aligned and coinciding with its travel path, said method comprising the steps of repeatedly subjecting the body to opposed forces acting inwardly along its major axis to progressively reduce the length of said major axis, said forces being applied to the dough body adjacent the ends of such major axis and moving in directional correspondence with the travel of the conveyor as well as inwardly, the distance between the opposed points of applied forces at the terminus of each of said applications of force being successively less until said distance ultimately approximates the desired diameter of the dough body.

References Cited in the file of this patent

UNITED STATES PATENTS

| Number | Name | Date |
|---|---|---|
| 925,235 | Scott et al. | June 15, 1909 |
| 936,660 | Petri | Oct. 12, 1909 |
| 1,109,259 | Sons et al. | Sept. 1, 1914 |
| 1,150,655 | Bertram | Aug. 17, 1915 |
| 1,492,707 | Gallea | May 6, 1924 |
| 1,518,534 | Metcalf | Dec. 9, 1924 |
| 2,097,515 | Chambless | Nov. 2, 1937 |
| 2,247,863 | Tiedemann | July 1, 1941 |
| 2,345,637 | Stiles | Apr. 4, 1944 |
| 2,431,074 | Palmer | Nov. 18, 1947 |
| 2,456,372 | Buechek | Dec. 14, 1948 |

FOREIGN PATENTS

| Number | Country | Date |
|---|---|---|
| 8,664 | Great Britain | Dec. 8, 1915 |
| 299,221 | Great Britain | Oct. 25, 1928 |
| 448,049 | Germany | Aug. 6, 1927 |